United States Patent [19]

Eckart et al.

[11] 4,143,261

[45] Mar. 6, 1979

[54] APPARATUS USEFUL FOR EXPOSING A CIRCUMFERENTIAL PATH AROUND A WORKPIECE TO TOOL MEANS

[75] Inventors: Frederick Eckart, Southington; Raymond A. Elliott, Glastonbury; Christopher H. Feigl, Vernon, all of Conn.

[73] Assignee: United Technologies Corporation, Hartford, Conn.

[21] Appl. No.: 862,710

[22] Filed: Dec. 21, 1977

[51] Int. Cl.² .............................................. B23K 9/00
[52] U.S. Cl. .................................................. 219/121 L
[58] Field of Search ..... 219/121 L, 121 LM, 121 EB, 219/121 EM, 69 E, 69 V, 124.22, 124.4, 125.11

[56] References Cited

U.S. PATENT DOCUMENTS

| | | | |
|---|---|---|---|
| 3,474,215 | 10/1969 | Johanson | 219/69 E |
| 3,673,372 | 6/1972 | Veroman et al. | 219/69 V |
| 3,949,186 | 4/1976 | Nakayama et al. | 219/121 LM |
| 3,978,310 | 3/1975 | Gleason | 219/125.11 |
| 4,048,464 | 9/1977 | Gale | 219/121 LM |

Primary Examiner—J. V. Truhe
Assistant Examiner—Fred E. Bell
Attorney, Agent, or Firm—Edward J. Timmer

[57] ABSTRACT

The invention provides an apparatus capable of effecting relative movement between the oval-like girth or circumference of a workpiece and tool means while maintaining the planar and radial workpiece surfaces in a fixed plane relative to the tool means as they are exposed thereto. The apparatus is especially useful in laser welding an oval-like girth joint around a workpiece since the workpiece surface is always maintained in a substantially fixed plane relative to the lens which focuses the laser beam, thereby maintaining proper beam focusing and angle of beam incidence on the surface throughout the entire welding process. For laser welding, the apparatus includes a base in a fixed plane relative to the focusing lens, means for effecting relative translational movement between the base and lens, and bearing and shaft means, including chuck means, for holding the workpiece in proper relation to the lens and for rotating the workpiece about longitudinal axes through the radii of the oval-like workpiece girth. The relative translational movement between the base and lens is utilized to cause the laser beam to transverse the planar surfaces of the workpiece whereas the rotational motion is utilized to cause the beam to traverse the radial surfaces of the workpiece while maintaining these latter surfaces in the plane established by the planar surfaces during their exposure to the tool means. By the sequential translation-rotation movements, the entire oval-like workpiece girth can be continuously traversed in seconds by the laser beam, all the while maintaining proper beam focusing and angle of incidence thereon.

11 Claims, 13 Drawing Figures

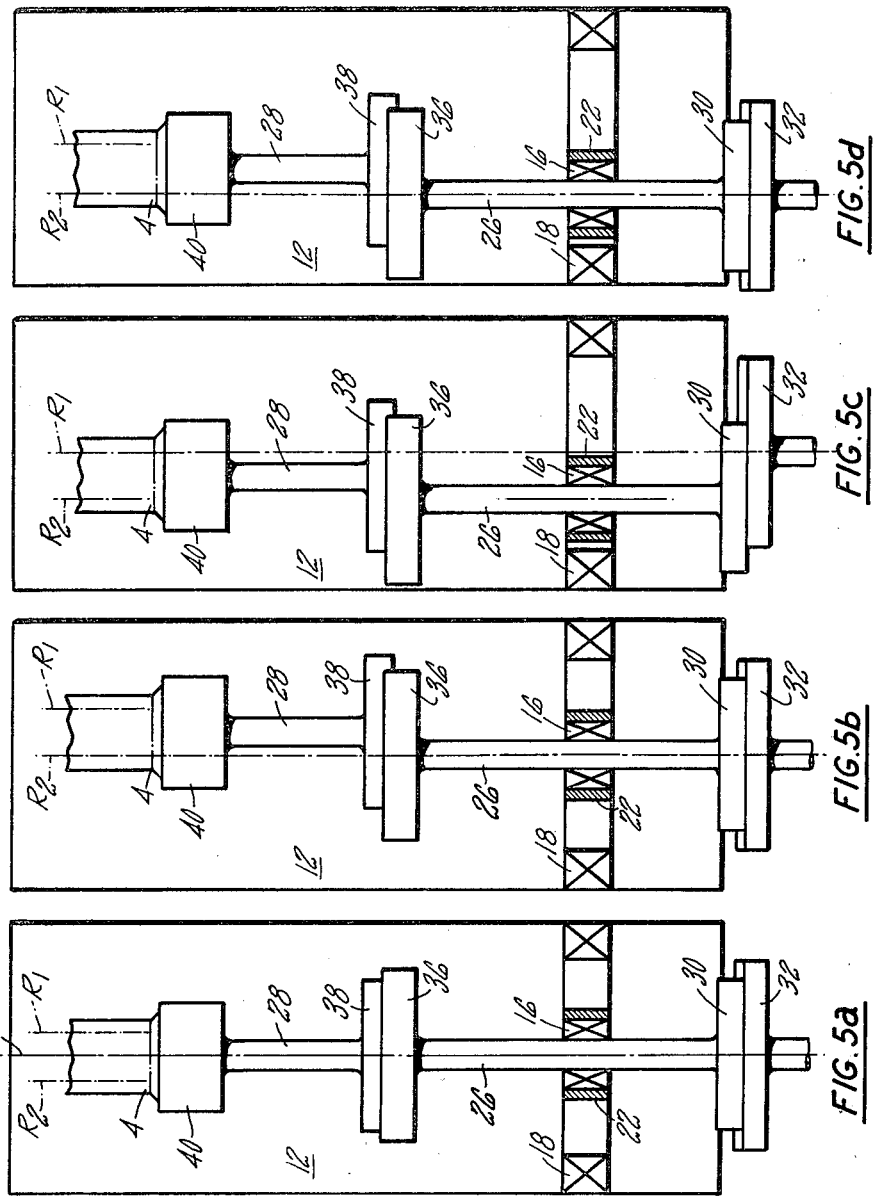
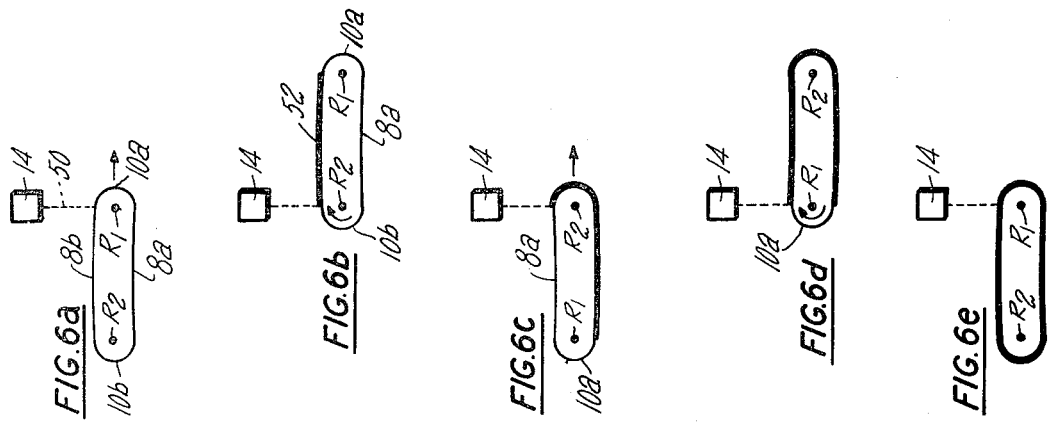

APPARATUS USEFUL FOR EXPOSING A CIRCUMFERENTIAL PATH AROUND A WORKPIECE TO TOOL MEANS

BACKGROUND OF THE INVENTION

1. Field of the Invention

The present invention relates to workpiece fixturing devices adapted for moving a workpiece surface and tool means in predetermined relation to one another and, more particularly, to such devices capable of moving a workpiece circumference or girth having no rotational symmetry in prescribed relation to tool means.

2. Description of the Prior Art

Laser welding is a rapidly developing technique for joining metal parts together to form useful products. In laser welding, it is important that the laser beam be focused properly on the workpiece surfaces being joined. If the focus of the beam changes during welding, numerous problems can arise, not the least of which is that a faulty weld is produced due to improper heating of the surfaces. In laser welding parts having rotational symmetry, for example, such as cylindrical tubes, there is usually little difficulty in maintaining proper beam focusing since the parts can be rotated about their axes at a fixed distance from the lens which focuses the laser beam. Once focused, the laser beam is caused to travel around the joint simply by rotating the parts. However, in welding parts having no rotational symmetry, the problem of maintaining proper beam focusing on the workpiece surfaces has been severe and has limited the application of laser welding in production applications.

An example of the problem encountered in laser welding parts having no rotational symmetry is the gas impingement tube which is inserted in certain gas turbine engine blades to direct cooling air therethrough. A typical impingement tube comprises an elongated section having an approximate airfoil shape and a wedge shaped section, the sections having an oval-like girth or cross-section where they are to be joined together, FIGS. 1 and 2. In the past, the oval-like girth joint around the tube sections has been welded by electron beam techniques, the more or less planar portions of the joint being machine-welded while the radial portions are made manually. Of course, this welding technique is not only time consuming but also requires numerous weld dressing steps during the operation. Attempts to laser weld the complete girth joint have failed due to inability in maintaining proper focusing of the beam as it travels from the planar portions of the weld to the radial portions and also inability in maintaining the proper angle of incidence of the beam on the surfaces as it moves thereacross.

SUMMARY OF THE INVENTION

Accordingly, the present invention provides an improved apparatus capable of effecting relative movement between the oval-like girth of a workpiece and tool means while maintaining the planar and radial workpiece surfaces in a fixed plane relative to the tool means as they are exposed thereto. The apparatus is especially useful in laser welding oval-shaped girth joints since beam focus and angle of incidence remain substantially unchanged as the beam traverses the planar portions and radial portions of the girth.

In a typical embodiment of the invention, the apparatus includes a base in a fixed plane relative to the tool means and bearing and shaft means mounted on the base. The bearing and shaft means typically include an inner and outer bearing mounted in a support member affixed to the base, the inner bearing being eccentrically disposed within the outer bearing such that the central axis of the inner bearing is coincident with a longitudinal axis through the radius of one of the radial portions of the girth and the central axis of the outer bearing is similarly coincident with a longitudinal axis through the radius of the other radial portion. Also, included is a shaft journaled in the inner bearing, the shaft having one end adapted to be rotated and the other end carrying a chuck device to hold the workpiece in prescribed alignment with the bearing axes and the planar portions of the workpiece the proper distance from the tool means, that is, in the proper fixed plane relative to the tool means. Of course, in this arrangement, the axes of the bearings and the shaft are coplanar with the longitudinal axes through the girth radii. To effect relative movement between the workpiece girth and tool means, means for effecting relative translational movement between the base and tool means and for rotating the end of the shaft opposite the chuck device are provided. For example, in typical operation for laser welding an oval-like girth joint around a workpiece, the base of the apparatus is made movable with respect to the laser beam focusing lens and also to the rotating means, both of which are independently and fixedly mounted from the base. Typically, the girth weld is made by translating the base relative to the fixed components to cause the laser beam to traverse a planar portion of the oval-like girth. Then, when the first radial portion of the girth is reached, the rotating means is activated to rotate the inner bearing and shaft journaled therein eccentrically within the outer bearing. This eccentric motion, in turn, causes the workpiece to be rotated about the longitudinal axis through the first radial portion and not only exposes the first radial workpiece surface to the laser beam but also maintains the radial surface in the plane established by the previously welded planar portion of the workpiece, thereby maintaining a substantially constant focal length between the lens and workpiece surface and constant angle of beam incidence on the workpiece surface. After the first radial portion is traversed, the base is again translated relative to the lens and rotating device to weld the other planar portion of the girth. Finally, when the second radial portion is reached, the rotating apparatus is activated to rotate the shaft journaled in the inner bearing about its own axis. This noneccentric motion effects rotation of the workpiece about the other longitudinal axis and causes the second radial workpiece surface to be traversed by the laser beam, the rotation maintaining the second radial surface in the plane of the previously welded planar surface. By such sequential translation-rotation or rotation-translation motion of the workpiece relative to the lens, the laser beam can be caused to continuously traverse the entire oval-like workpiece girth to make the weld.

In a preferred embodiment of the invention, the bearing and shaft assembly includes adjustable components to accommodate different sizes of oval-like workpiece girths, that is, mechanisms are provided for varying the eccentricity of the inner bearing so that the distance between the bearing axes can be varied. In an even more preferred embodiment for welding, the chuck device holding the workpiece is provided with a shroud to substantially enclose the workpiece and also with means for introducing a protective atmosphere into the shroud and/or through the workpiece.

Other advantages and objects of the present invention will become more fully apparent from the following drawings and detailed description of preferred embodiments.

BRIEF DESCRIPTION OF THE DRAWINGS

FIG. 5, a through d, is a schematic illustration showing the axial relationships established among the components of the apparatus prior to and during welding.

FIG. 6, a through e, is a schematic illustration showing a typical welding cycle around the planar and radial portions of the impingement tube girth.

DESCRIPTION OF THE PREFERRED EMBODIMENTS

Figure 1:
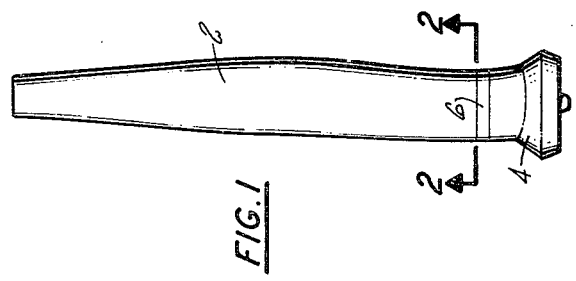
FIG. 1 is a side elevational view of a typical impingement tube inserted in a gas turbine blade.
Figure 2:
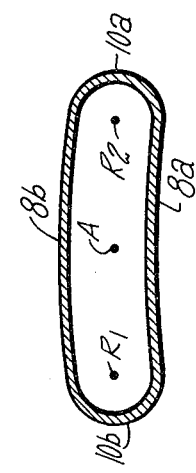
FIG. 2 is a cross-sectional view of the impingement tube along line 2—2 of FIG. 1.

Referring first to FIGS. 1 and 2, a typical gas impingement tube adapted for insertion in a gas turbine blade to direct cooling air therethrough is shown. The impingement tube is generally fabricated in two sections, an elongated section 2 having a general airfoil shape and a wedge shaped or root section 4. The two sections are joined together by a girth weld 6. As shown, the tube sections are hollow and have a generally oval cross-section or girth at the joint, the oval girth being comprised of more or less planar portions 8a and 8b and radial portions 10a and 10b. Although the planar portions of the tube are somewhat arcuate, the amount of curvature along these portions is small enough to be disregarded in terms of achieving the purposes of the present invention.

Figure 3:
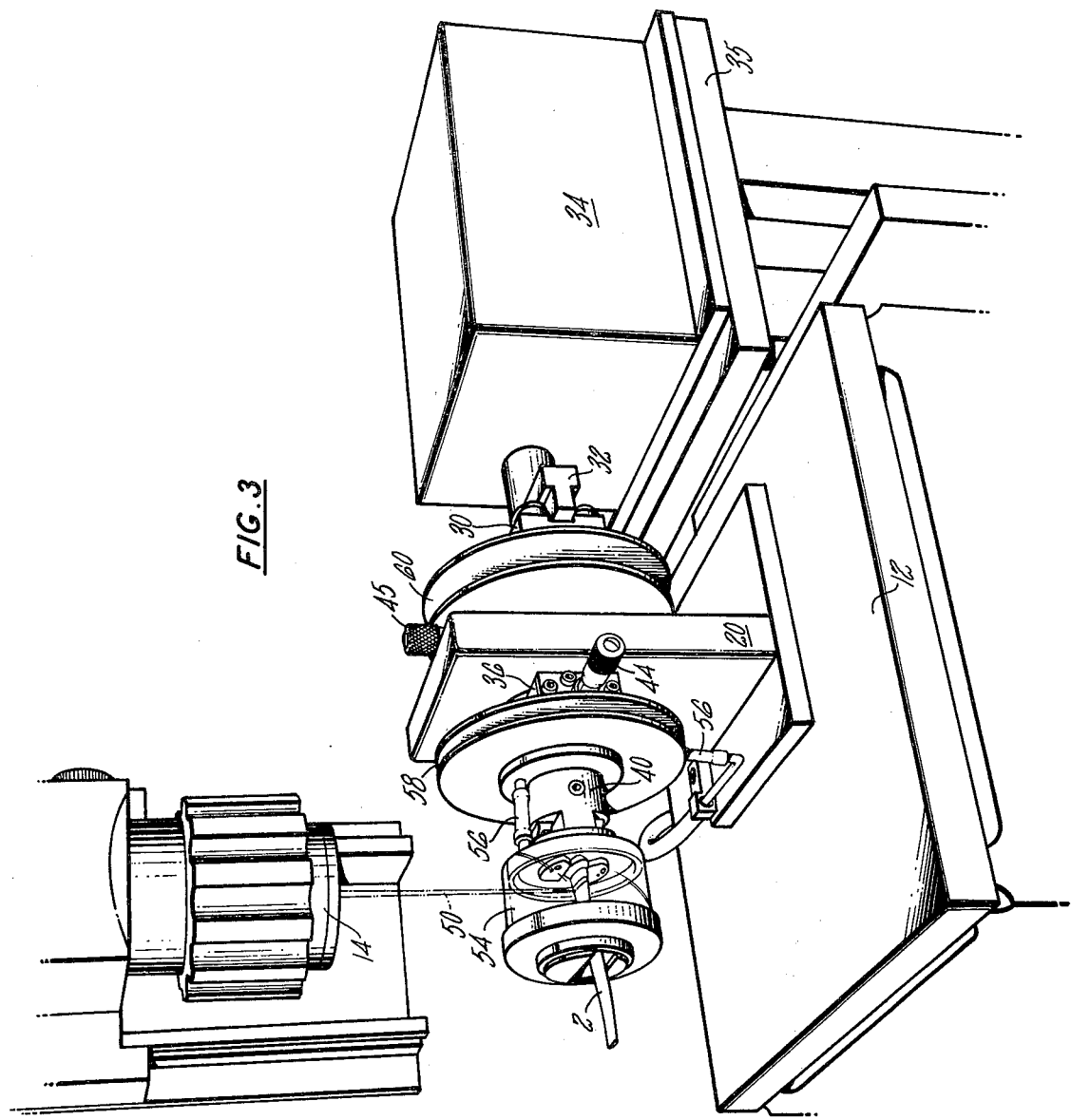
FIG. 3 is a perspective view of a typical apparatus of the invention.
Figure 4:
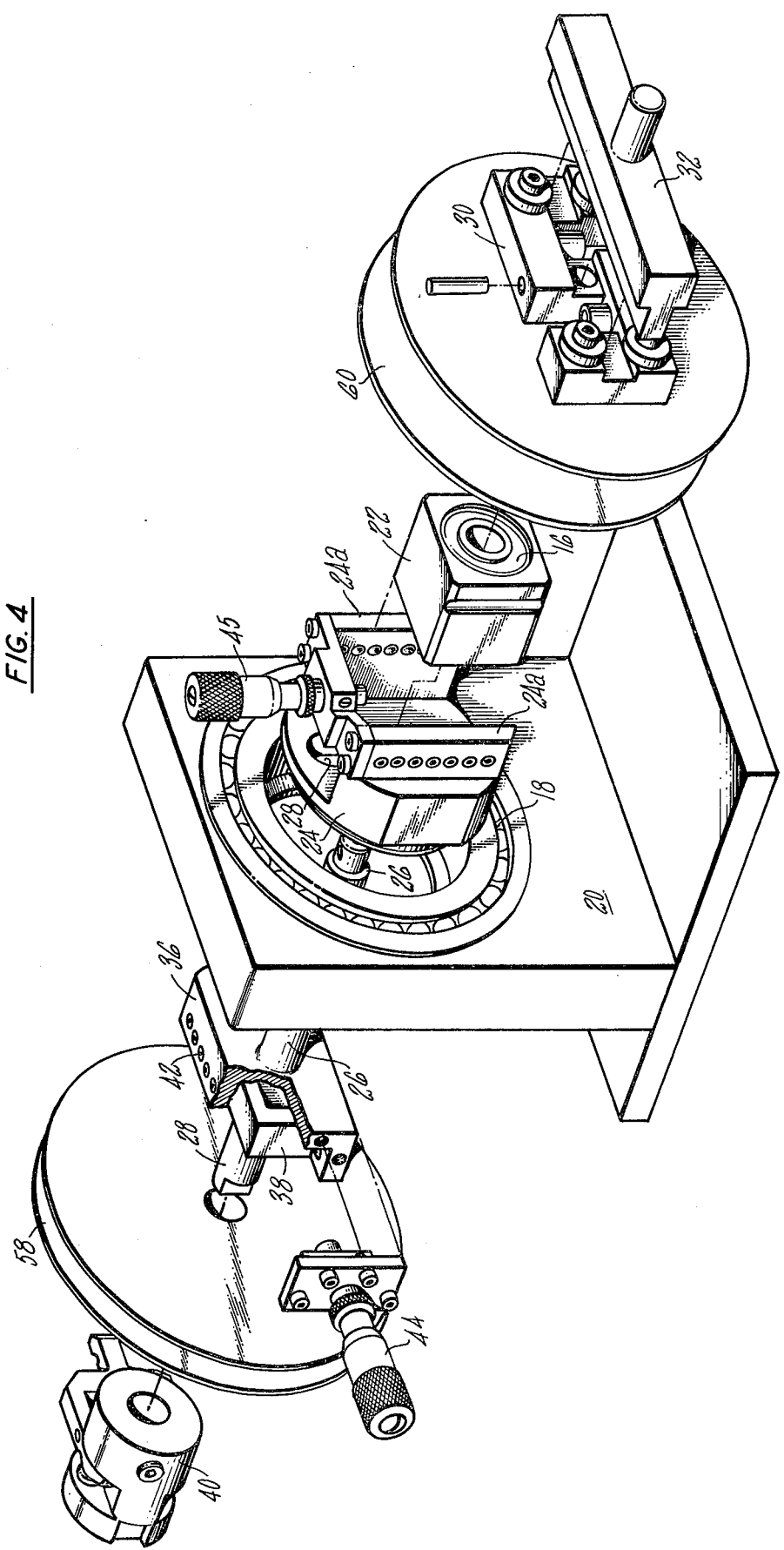
FIG. 4 is an exploded perspective view of the bearing and shaft assembly of the inventive apparatus.

FIG. 3 shows a preferred apparatus of the invention for use in laser welding the girth weld 6 around the tube sections after they have been tack-welded together. The apparatus includes a base 12 mounted in a fixed plane relative to stationary focusing lens 14, the plane of the base being illustrated as normal to the axis of the lens. Conventional guide rail and motor means (not shown) are associated with the base to effect translational movement thereof with respect to the stationary lens 14. Mounted on the base is a bearing and shaft assembly for holding the workpiece in predetermined relation to the lens and for imparting the desired rotational motion thereto during the welding cycle. As shown in greater detail in FIG. 4, the assembly basically includes an inner bearing 16 and outer bearing 18 mounted in support member 20 which is affixed to the base, the inner bearing being eccentrically disposed within the outer bearing. To accommodate different tube girth sizes, the inner bearing is mounted within slide 22 which, in turn, is slidably disposed in slide holder 24. Slide holder 24 is rotatably disposed in the outer bearing 18 and includes flanges 24a between which the slide is disposed. Journaled in the inner bearing 16 is a first shaft 26 which extends through a notch 28 in the slide holder. The first shaft has one end adapted to be rotated, such as by having coupling 30 which is slidably engaged to complementary coupling 32 on the shaft of rotating device 34 which is mounted on platform 35 independent and in fixed position relative to the movable base. The couplings 30 and 32 allow the base to be translated relative to the rotating device and still allow shaft 26 to be rotated. The other end of shaft 26 is coupled to a second shaft 28 by means of couplings 36 and 38 associated with the first and second shafts, respectively. As will be explained herebelow, couplings 36 and 38, along with slide 22 and couplings 30 and 32, permit alignment of the impingement tube axes with the axes of the inner and outer bearings. The uncoupled end of second shaft 28 carries a suitable chuck 40 for holding the impingement tube in proper relation to the lens and to the bearing axes.

FIGS. 5a through 5d illustrate schematically the axial relationships which are established among the various components of the apparatus in order to achieve the desired workpiece motion. In FIG. 5a, the apparatus is shown in the initial position wherein the central axes of inner and outer bearing 16 and 18 are coincident with one another and with those of shafts 26 and 28 and the longitudinal axis A through the midpoint between radii $R_1$ and $R_2$ of the tube girth. In FIG. 5b, shaft 28 is shown offset from the central axes of the bearings by a distance equal to one-half the spacing between radii $R_1$ and $R_2$. This offset, as can be seen, aligns the longitudinal axis through radius $R_2$ with the central axis of the inner bearing 16. Movement of shaft 28 in such a manner is achieved by sliding coupling 38 relative to coupling 36 and then locking this coupling in the desired position, such as by set screws 42. Micrometer means 44 attached to the coupling 36 can be used to establish the offset distance precisely. FIG. 5c shows the final alignment step wherein the slide 22 is offset from the central axis of the outer bearing by a distance equal to the spacing between radii $R_1$ and $R_2$. As shown, this offset aligns the central axis of the outer bearing 18 with the longitudinal axis through radius $R_1$, the inner bearing and shaft 26 being thereby disposed eccentrically relative to the outer bearing. Micrometer means 45 are used to precisely position slide 22. In the configuration shown in FIG. 5c, when rotating device 34 is activated, shafts 26 and 28 are rotated eccentrically about the central axis of the outer bearing and this motion causes the impingement tube to be rotated about the longitudinal axis through radius $R_1$. However, when the base is translated to align the central axes of the inner bearing 16 and shaft 26 with the rotational axis of device 34, FIG. 5d, and the device is activated, the tube will be rotated about the longitudinal axis through radius $R_2$, as is apparent from the Figure. Since the axes of the inner and outer bearings and the shafts are coplanar with the longitudinal axes through radii, $R_1$ and $R_2$, the rotational motions just described maintain the radial surface portions 10a and 10b in the plane established by planar surface 8a and 8b relative to the focusing lens. Thus, the radial surfaces of the tube girth can be exposed to the laser beam while maintaining the focal length and angle of incidence of the beam substantially constant.

FIG. 6a through 6d illustrate schematically a typical welding cycle used to weld the oval girth joint between the tube sections. For example, the laser beam 50 is focused on planar surface 8b in line with radius $R_1$. Then, the base is translated in the direction of the arrow to form the weld 52 on planar surface 8b as shown. When the laser beam is in line with radius $R_2$, the tube is rotated about the longitudinal axis through that radius FIG. 6b, as described above. One-half of the girth joint has now been welded. In FIG. 6c and 6d the base is again translated to weld planar surface 8a and the tube rotated about the longitudinal axis through $R_1$ to weld radial surface 10a. Preferably, translation of the base and rotation of the tube itself are sequentially coordinated by N/C tape, computer or other automatic means. Of course, any sequence of translation-rotation can be employed as desired. When sequenced automatically as shown in FIG. 6, the girth weld around a typical gas impingement can be made in from about 10 to 20 seconds.

A particularly preferred embodiment of the invention for laser welding oval-like girth joints also includes a shroud 54 attached to the chuck device 40 to enclose the impingement tube held therein, see FIG. 3. The shroud may be a quartz cylinder to allow passage of the laser beam with no diminution in power. The shroud can be provided with a shielding gas, such as argon, helium and the like, through suitable tubes 56 connected to a gas source. In addition, a tube or passage (not shown) can be disposed internally through the chuck to introduce a shielding gas through the interior of the impingement tube as well. Reels 58 and 60 may be mounted on shafts 26 and 28 to provide the necessary length of tubing during rotation of the workpiece. Of course, those skilled in the art will recognize that the quartz shroud and gas supply tubes may be eliminated if the apparatus of the invention is enclosed within a vacuum or other chamber.

It will also be recognized that certain components of the apparatus described in detail above may be unnecessary if the size of the workpiece does not vary. For example, if the same workpiece is to be welded or otherwise treated, means for adjusting the eccentricity of the inner bearing and shafts 26 and 28 relative to the outer bearing are unnecessary. Thus, slide 22, slide holder 24, and micrometer means 44 and 45 could be deleted. In addition, rather than using dual offset shafts 26 and 28, a single shaft journaled in the inner bearing and having one end rotated and the other carrying the chuck 40 could be utilized so long as the prescribed axial relationships are established between the workpiece and bearing axes.

Furthermore, the present invention is intended to include within its scope apparatus wherein the focusing lens 14 and rotating device 34 are moved translationally relative to a fixed base, the important requisite for achievement of the purposes and objects of the invention being to obtain the desired relative movement among these components. Of course, those skilled in the art will recognize that other workpieces having oval-like girths can be welded or treated with this apparatus. As used herein, oval-like is intended to include approximate as well as actual oval shapes. For example, some variance from an exact oval shape can be tolerated in the apparatus of the invention, such as the slight curvature of planar surfaces 8a and 8b. Likewise, some deviation in the radial surfaces is also tolerable. The amount of variance from the exact oval shape that can be tolerated will depend for the most part on the type of operation to be performed on the workpiece.

It should be apparent that the apparatus of the invention can be used not only to laser weld oval-like girth joints but also can be adapted for TIG and other welding processes. In addition, the apparatus can find use in machining operations, such as cutting or abrading; inspection operations, such as X-ray analysis; coating operations; heat treating operations or many others to be performed on an oval-like workpiece girth by tool means.

Further, those skilled in the art will recognize that other changes, omissions and additions in the form and detail of the illustrated embodiment may be made without departing from the spirit and scope of the invention.

Having thus described a typical embodiment of my invention, that which I claim as new and desire to secure by Letters Patent of the United States is:

1. An apparatus useful for exposing an oval-like workpiece girth comprised of planar and radial surfaces to tool means while maintaining the surfaces in a fixed plane relative to the tool means as each is exposed thereto, comprising:
    (a) a base in a fixed plane relative to the tool means;
    (b) means for effecting relative translational motion between the base and tool means;
    (c) bearing and shaft means, the shaft means including chuck means, mounted on the base for establishing the planar portions of the workpiece girth in a prescribed fixed plane as each is exposed to the tool means and for rotating the workpiece independently about longitudinal axes through the radii of the radial portions of the girth; and
    (d) means for rotating the bearing and shaft means and thus the workpiece fixtured thereon;
    said girth being exposed to the tool means by effecting sequential translational motion between the base on which the workpiece is fixtured and tool means and rotational motion independently about said longitudinal axes, the translational motion being utilized to expose the planar surfaces of the workpiece girth to the tool means and the rotational motion being utilized to expose the radial surfaces of the girth to the tool means while maintaining said radial surfaces in the fixed plane established by the planar surfaces as each is exposed to the tool means.

2. The apparatus of claim 1 wherein the base is movably mounted relative to stationary tool means to effect relative translational movement therebetween.

3. The apparatus of claim 1 which further includes a support member affixed to the base and wherein the bearing and shaft means includes an inner and outer bearing mounted in the support member, the inner bearing being eccentrically disposed within the outer bearing such that the central axis of the inner bearing is coincident with one of said longitudinal axes through one of the radial portions of the workpiece girth and the central axis of the outer bearing is coincident with the longitudinal axis through the other radial portion of the girth, the axes of the bearings thereby being coplanar with said longitudinal axes, and also including a shaft journaled in the inner bearing, the shaft having one end adapted to be rotated by said rotating means and the other end carrying chuck means for holding the workpiece in the prescribed planar relation to the tool means and axial relation to the bearings, rotational motion of the workpiece independently about said longitudinal axes being effected by translating the base to align one of said longitudinal axes with the rotational axis of the rotating means and then rotating said shaft and thereafter repeating the sequence for the other longitudinal axis, wherein one of said rotations of the shaft is eccentric about the central axis of the outer bearing and the other rotation of the shaft is about its own axis.

4. An apparatus useful for exposing an oval-like workpiece girth comprised of planar and radial surfaces to tool means while maintaining the surfaces in a fixed plane relative to the tool means as each is exposed thereto, comprising:

(a) a base in a fixed plane relative to the tool means;
(b) means for effecting relative translational motion between the base and tool means;
(c) a support member affixed to the base;
(d) a bearing and shaft assembly, including an inner and outer bearing mounted in the support member, the inner bearing being eccentrically disposed within the outer bearing such that the central axis of the inner bearing is coincident with a longitudinal axis through the radius of one of the radial portions of the workpiece girth and the central axis of the outer bearing is coincident with a longitudinal axis through the radius of the other radial portion of the girth, the axes of the bearings thereby being coplanar with said longitudinal axes, and also including a shaft journaled in the inner bearing, the shaft having one end adapted to be rotated and the other end carrying chuck means for holding the workpiece in the prescribed planar relation to the tool means and axial relation to the bearings; and
(e) means for rotating the end of the shaft opposite the chuck means;

said girth being exposed to the tool means by effecting sequential translational and rotational motions, the translational motion between the base on which the workpiece is fixtured and tool means being utilized to expose the planar surfaces of the workpiece girth to the tool means and the rotational motion of the workpiece independently about the longitudinal axes being utilized to expose the radial surfaces of the girth to the tool means, rotation about said axes maintaining said radial surfaces in the fixed plane established by each planar surface as it is exposed to the tool means, said rotational motion being effected by translating the base to align one of said longitudinal axes with the rotational axis of the rotating means and rotating said shaft and then repeating the sequence for the other longitudinal axis, wherein one of said rotations of the shaft is eccentric about the central axis of the outer bearing and the other rotation of the shaft is about its own axis.

5. The apparatus of claim 4 wherein the base is movably mounted relative to stationary tool means to effect relative movement therebetween.

6. The apparatus of claim 5 wherein the rotating means is independently and fixedly mounted from the movable base, said rotating means having coupling means for engaging the end of the shaft opposite the chuck means in a slidable manner to allow said translational movement of the base while retaining capability to impart rotational motion to said shaft.

7. An apparatus useful for exposing an oval-like workpiece girth to a laser beam while maintaining the planar and radial workpiece surfaces in a fixed plane relative to the beam focusing lens so that the focal length and angle of incidence of the beam remain substantially unchanged during traverse over the planar and radial surfaces, comprising:

(a) a base movable in a fixed plane relative to the laser beam focusing lens;
(b) a support member affixed to the base;
(c) a bearing and shaft assembly, including an inner and outer bearing mounted in the support member, the inner bearing being eccentrically disposed within the outer bearing such that the central axis of the inner bearing is coincident with a longitudinal axis through the radius of one of the radial portions of the workpiece girth and the central axis of the outer bearing is coincident with the longitudinal axis through the radius of the other radial portion of the girth, the axes of the bearings thereby being coplanar with said longitudinal axes, and also including a shaft journaled in the inner bearing, the shaft having one end adapted to be rotated and the other end carrying chuck means for holding the workpiece in the prescribed planar relation to the focusing lens and axial relation to the bearings; and
(d) means for rotating the end of the shaft opposite the chuck means, said means being independently and fixedly mounted from the base and having coupling means for engaging said end of the shaft in a slidable manner to allow translation of the base while retaining capability to impart rotational motion to said shaft;

said girth being exposed to the tool means by effecting sequential translational and rotational motions, the translational motion between the base on which the workpiece is fixtured and tool means being utilized to expose the planar surfaces of the workpiece girth to the tool means and the rotational motion of the workpiece independently about the longitudinal axes being utilized to expose the radial surfaces of the girth to the tool means while maintaining said radial surfaces in the fixed plane established by the planar surfaces as they are exposed to the tool means, said rotational motion being effected by translating the base to align one of said longitudinal axes with the rotational axis of the rotating means and rotating said shaft and then repeating the sequence for the other longitudinal axis, wherein one of said rotations of the shaft is eccentric about the central axis of the outer bearing and the other rotation of the shaft is about its own axis.

8. The apparatus of claim 7 wherein the bearing and shaft assembly further includes a slide holder member rotatably mounted in the outer bearing, a sliding member mounted slidably in the slide holder member, said inner bearing being mounted in the sliding member so that the distance between the axes of the inner and outer bearing can be varied to suit the particular size of oval-like girth to be exposed to the laser beam.

9. The apparatus of claim 7 wherein the chuck means includes a shroud member to enclose the area of the girth to be exposed to the laser beam and means for introducing a shielding gas into the shroud member.

10. The apparatus of claim 9 wherein the shroud member is quartz to permit passage of the laser beam without diminution in beam power.

11. The apparatus of claim 9 wherein the chuck means further includes means for introducing a shielding gas through the workpiece.

* * * * *